United States Patent
Dusch et al.

(10) Patent No.: US 8,184,620 B2
(45) Date of Patent: May 22, 2012

(54) METHOD FOR TRANSMITTING COMMUNICATION DATA

(75) Inventors: Edith Dusch, Würnitz (AT); Stephan Kennedy, Windach (DE); Martin Pellert, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1343 days.

(21) Appl. No.: 11/794,937

(22) PCT Filed: Dec. 7, 2005

(86) PCT No.: PCT/EP2005/056566
§ 371 (c)(1),
(2), (4) Date: Jul. 9, 2007

(87) PCT Pub. No.: WO2006/074844
PCT Pub. Date: Jul. 20, 2006

(65) Prior Publication Data
US 2008/0144608 A1    Jun. 19, 2008

(30) Foreign Application Priority Data

Jan. 11, 2005   (DE) .......................... 10 2005 001 257

(51) Int. Cl.
*H04L 12/66* (2006.01)
(52) U.S. Cl. .................................. 370/352; 370/395.21
(58) Field of Classification Search .................... None
See application file for complete search history.

(56) References Cited

U.S. PATENT DOCUMENTS

| | | | |
|---|---|---|---|
| 7,701,927 B2 | 4/2010 | Stampfl et al. | |
| 7,778,242 B1* | 8/2010 | Barany et al. | 370/356 |
| 2002/0141386 A1 | 10/2002 | Minert et al. | |
| 2003/0046706 A1* | 3/2003 | Rakib | 725/111 |
| 2003/0123097 A1* | 7/2003 | Fruth | 358/400 |
| 2003/0219006 A1* | 11/2003 | Har | 370/352 |
| 2004/0213152 A1* | 10/2004 | Matuoka et al. | 370/230 |
| 2005/0207358 A1* | 9/2005 | Nishida et al. | 370/261 |
| 2007/0058609 A1* | 3/2007 | Goel et al. | 370/352 |

FOREIGN PATENT DOCUMENTS

| | | |
|---|---|---|
| DE | 10054940 A1 | 5/2002 |
| DE | 103 54 947 A1 | 6/2005 |
| EP | 1047231 A2 | 10/2000 |
| WO | 03049456 A1 | 6/2003 |

OTHER PUBLICATIONS

Siemens "Hipath 4000 V2.0, Chapter 5: IP Changes", 2004, EN4416EN20EN, 1-48.*
Rosenberg, H Salama, M Squire, "Telephony Routing over IP (TRIP); rfc3219.txt", IETF Standard, Internet Engineering Task Force, IETF, CH, Jan. 2002, XP015008998, ISSN: 0000-0003.

* cited by examiner

*Primary Examiner* — Chirag Shah
*Assistant Examiner* — Salvador E Rivas

(57) ABSTRACT

Transmitting communication data for a connection between at least one calling first terminal and at least one called second terminal in an at least partly packet-oriented network comprising a plurality of node units, a primary connection being established via the packet-oriented network is provided. User data is detected and evaluated in the first node unit that is designated as a terminal node when the primary connection is established. Parameters of the node unit that are adjustable for converting and/or transmitting the user data are adapted to the evaluated user data. The parameters are transmitted to a second node unit that is designated as a terminal node, whereupon a direct media coupling connection is established between node units which have been designated as terminal nodes along the primary connection, the direct media coupling connection being established with parameters that are adapted to the evaluated user data.

20 Claims, 2 Drawing Sheets

METHOD FOR TRANSMITTING COMMUNICATION DATA

CROSS REFERENCE TO RELATED APPLICATIONS

This application is the US National Stage of International Application No. PCT/EP2005/056566, filed Dec. 7, 2005 and claims the benefit thereof. The International Application claims the benefits of German application No. 102005001257.4 DE filed Jan. 11, 2005, both of the applications are incorporated by reference herein in their entirety.

FIELD OF INVENTION

The invention relates to a method and an arrangement for transmitting communication data.

BACKGROUND OF THE INVENTION

In present-day communication systems it is known to transmit payload data, e.g. for the purpose of voice or video communication, both by means of what is referred to as circuit-switched technology and by way of packet-oriented networks. Communication systems which support both packet-oriented and circuit-switching transmission technologies are also referred to as "convergent" communication systems.

Based on the frequently used "Internet Protocol", also referred to as IP for short, the term "Voice over IP", abbreviated to VoIP, will also be used in the following description with reference to a packet-oriented transmission of payload data, for example voice data, the ITU-T standard (International Telecommunication Union-Telecommunications Standardization Sector) H.323 or the SIP (Session Initiation Protocol) protocol developed by the IETF (Internet Engineering Task Force) working group being widely established for VoIP communication.

A convergent communication system typically comprises at least one communication device by means of which a connection of both VoIP communication terminal devices and "traditional" communication terminal devices, i.e. terminal devices operating according to the circuit-switching principle, is made possible with the aid of appropriate interface modules. Interworking elements known as gateways are used for the purpose of converting between circuit-switched and packet-oriented transmission technologies. In this case a gateway performs a conversion between packet-oriented and circuit-switched transmission technologies and is often disposed between a packet-oriented network and a communication device operating according to a circuit-switching method. Here, the conversion relates both to signaling data and to payload data, i.e. in particular voice data, video data or also what is referred to as non-voice payload data such as, for example, tone signals of telecopying units or modems. "Payload" is the term used in technical circles for user information (useful) data. The gateways contain means for mutual conversion of data streams into suitable data packets. Digital signal processors, for example, are provided for converting payload data into digital information.

A problem occurring in convergent communication networks is an accumulation of multiple conversions between packet-oriented and circuit-switched transmission technologies which frequently has a negative impact on the voice quality on the communication units involved in the communication.

A method for direct media connection was proposed in the application with the application reference number 10354947.1 and the title "method for transmitting communication data in a communication system" filed with the German Patent and Trademark Office on Nov. 25, 2003, which method is characterized by a transmission of communication data via a direct media connection (DMC) without the involvement of a plurality of node units (gateways) and associated conversions necessary therewith.

The said method of a direct media connection for transmitting communication data in a communication system between a calling first communication unit and a called second communication unit initially provides a setup of a primary connection or "master connection". Said primary connection is set up starting from the first communication unit via at least one node unit to the second communication unit, with addressing data being contained in the message addressing data used for setting up the primary connection and belonging to the communication units and node units involved in the primary connection and said addressing data being transmitted by means of control messages for setting up the primary connection. The primary connection is set up by the first communication unit via at least one node unit to the second communication unit, the number of node units included for the primary connection being dependent on the network structure. An entry node is registered with the aid of the transmitted addressing data of the communication unit involved in the setting up of the primary connection. The entry node is defined by the first conversion of circuit-switched to packet-oriented communication data necessary along the primary connection. The exit node is defined by the last conversion of packet-oriented to circuit-switched communication data necessary along the primary connection.

In this scheme the entry node is the first unit having valid addressing data, i.e. the first communication unit having valid addressing data itself or the first node unit having valid addressing data. In other words, in the event that the first communication unit has valid addressing data, said communication unit will be registered as the entry node. Valid addressing data in this case is for example the provision of a communication unit or node unit having a network address by means of which the communication unit or node unit can be addressed by a, for example, packet-oriented network. In an analogous manner a last node unit having valid addressing data and disposed along the primary connection or the second communication unit itself, provided it has valid addressing data, is registered as the exit node. Both, the entry node and the exit node, form the end nodes of a direct media connection that is to be embodied. Provided as the final method step is the embodiment of a secondary connection or direct media connection (DMC) between the formerly registered end node, i.e. entry node and exit node, via a network that is available in the communication system. The communication data, in particular payload data, is thereupon transmitted via the secondary connection. In the case of a choice of a packet-oriented transmission mode for the secondary connection this means that multiple conversions over the length of the secondary connection can be avoided. The packet-oriented transmission mode is retained without further conversion along the secondary connection as far as the exit node.

In short, the method for direct media connection is therefore characterized in that from the time of a connection being accepted by the called communication unit a direct connection via as large a segment of a common packet-oriented network as possible is embodied between two end points. In a transmission of communication data, in the form of voice for example, a substantial improvement in the voice quality is noticeable, both at the calling first and at the called second communication unit, as a result of the use of the proposed method.

SUMMARY OF INVENTION

The above-cited method for direct media connection reveals itself meanwhile as problematical for situations in which the communication units participating in a communication connection are provided for transmitting telecopying or modem tones and for this purpose are present for example as a telecopier or fax machine, as a modem or generally as a unit for transmitting non-voice payload data. In the case of an embodiment of a communication connection for transmission of telecopying data, it is normal already before the end-to-end through-connection of the communication connection to transmit data in the traffic (payload data) channel by means of which an agreement for initiating the data connection between the communication units takes place prior to the transmission of the actual image data of the telecopy that is to be executed. This payload data for agreeing an initiation of the data connection is exchanged for example in the form of signal tones. For telecopying units a signal called a "CNG signal" or, as the case may be, "calling tone" is known for requesting a switchover into the transmission mode. A further signal based on at least one signal tone is the CED signal, "Called Terminal Identification". CED signals are transmitted by called telecopying units on the traffic (payload data) channel in order to indicate that the telecopying unit is in the transmission mode.

These payload signals sent in the form of signal tones already before the final end-to-end embodiment of the connection are used in node units or gateways for an assessment of the transmission parameters in order to optimize the non-voice communication connection in the packet-oriented sections of the communication network. A possible optimization is, for example, a switch from high-compression payload data coding methods to low-compression coding methods. Current compression methods are optimized for voice payload data. Since the frequency spectrum of non-voice payload data is wider than for voice data, non-voice payload data can be lost by high-compression coding methods. On the other hand, a setup of a DMC (Direct Media Connection) transmission path provided subsequently by way of the direct media connection leads to a deterioration in or even a failure of the transmission, since in the case of this DMC transmission path the assessment of the transmission parameters for the purpose of optimizing the non-voice communication connection that is provided in the node units is not taken into account in the packet-oriented sections of the communication network. In present-day communication systems and/or networks the consequence of this deterioration is that methods for a direct media connection cannot be used for non-voice communication connections.

A possible alternative for resolving the problems of a direct media connection would be to dispense with said direct connection. This would mean establishing the communication connection in the heterogeneous network over a plurality of node units or gateways exclusively over the path of the primary connection (cf. above). However, an exclusively primary connection running via a plurality of node units also cannot be used for non-voice communication connections, since a multiple conversion involves a loss of quality associated therewith. It is not possible to operate an error-free non-voice communication connection over more then two conversion operations between circuit-switched and packet-oriented transmission modes because of said losses in quality.

A third alternative for embodying a communication connection in a heterogeneous communication system provides that in the case of a non-voice connection that is to be set up, said connection is established by way of a circuit-switched transmission mode or, as the case may be, TDM (Time Division Multiplex) mode. However, this measure represents a retrograde technical step back to a transmission technique which was precisely intended to be superseded by packet-oriented VoIP telephony. Furthermore the circuit-switched transmission technique requires a fixed, radially concentrated (star-shape) line routing between the respective end points or node units which, because of the packet-oriented architecture, is generally not present at the required points, but whose allocation is associated at least with additional costs.

An object of the invention is to specify a method for a communication connection in a communication system operating according to the principle of direct media connection which avoids the disadvantages of the prior art.

The object is achieved with regard to its method aspect by means of a method having the features recited in the independent claim.

The invention is based on a method for transmitting communication data for a connection in an at least partially packet-oriented network between at least one calling first terminal device and at least one called second terminal device, comprising a plurality of node units, wherein a primary connection is set up via the packet-oriented network. Next, a direct media connection is set up between two node units defined as the first and second end nodes along the primary connection.

According to the invention it is provided that during the setup of the primary connection payload data is detected and evaluated in the first node unit defined as an end node. Parameters of the node unit which can be set for converting and/or transmitting the payload data are matched to the evaluated payload data. The parameters are sent to a second node unit defined as an end node. Next, the direct media connection is set up, this being established using parameters matched to the evaluated payload data.

A significant advantage of the method according to the invention is to be seen as a result of the early optimization of the direct media connection, the transmission parameters of which are set already before its setup. The node units involved in the direct media connection, i.e. end nodes, are matched to each other in terms of their transmission parameters at an early stage, which considerably improves the quality of the direct media connection. Since the transmission parameters are converted already before the direct media connection is set up, no unavoidable gaps in the transmission of the payload data are produced as a result of a conversion of the transmission parameters after the direct media connection has been set up.

A further advantage is given by the assessment of the type of payload data connections. If non-voice signal tones are detected in a node unit, the method according to the invention enables the transmission parameters of the direct media connection, e.g. codec setting values, to be set specifically to match said non-voice signal tones.

Advantageous developments of the invention are set forth in the dependent claims.

BRIEF DESCRIPTION OF THE DRAWINGS

An exemplary embodiment with further advantages and refinements of the invention is explained in more detail below with reference to the drawing, in which.

DETAILED DESCRIPTION OF INVENTION

Figure 1:
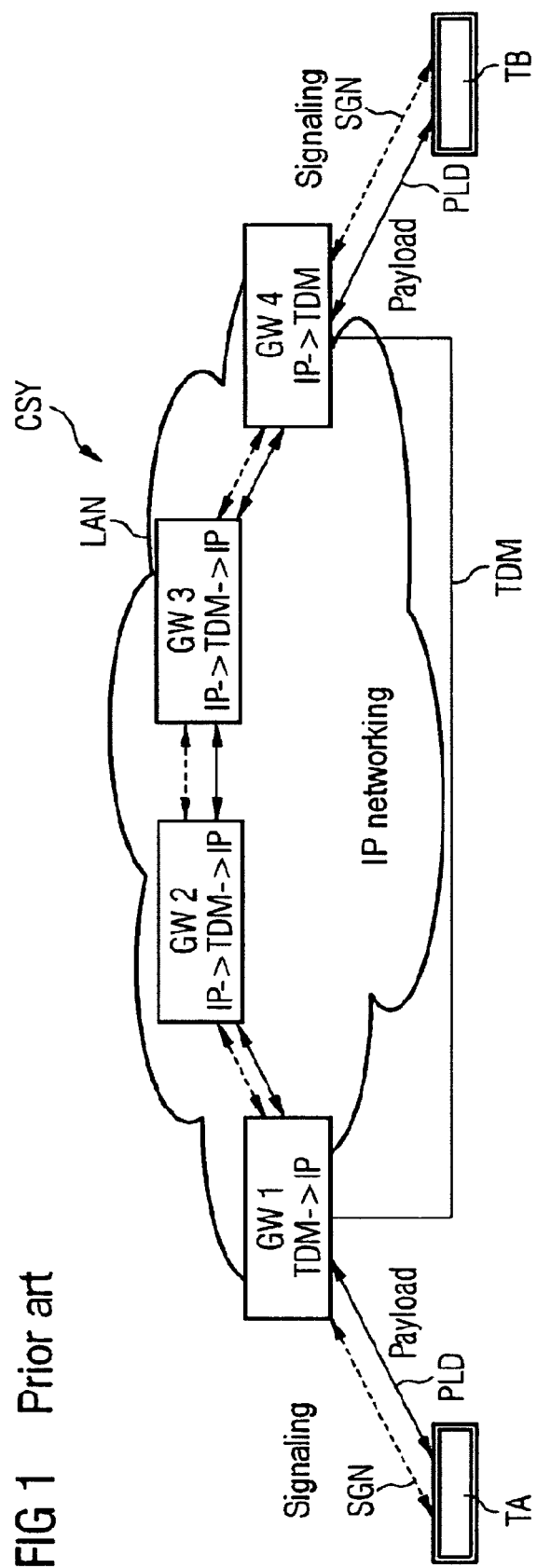
FIG. 1: shows a structural diagram schematically representing a communication session of terminal devices in a heterogeneous communication system using a timeslot-oriented connection.

FIG. 1 shows a communication system CSY known in the current prior art, consisting of four node units GW1, GW2, GW3, GW4 connected to a packet-oriented network LAN. The packet-oriented network LAN is embodied as a local area network, intranet, corporate network, as a domain of a larger constellation of networks or else as part of a global data network such as, for example, the so-called World Wide Web (WWW).

A first terminal device TA is connected to a first node unit GW1, and a second terminal device TB is connected to a fourth node unit GW4. The connection mode of the first and second terminal devices TA, TB is timeslot-oriented (TDM, Time Division Multiplex) and implemented with a separation, known for example in the ISDN (Integrated Services Digital Network), into signaling data SGN and payload data PLD. In the drawing, signaling data SGN is represented by means of a dashed line, and payload data PLD by means of an unbroken line. This representation also applies to the lines symbolizing the packet-oriented data exchange between the node units GW1, GW2, GW3, GW4, although for reasons of clarity these lines are not provided with the corresponding abbreviations for the signaling data SGN and payload data PLD.

Signaling and payload data SGN, PLD transmitted in timeslot-oriented mode is converted in the first node unit GW1 into a signaling and payload data SGN, PLD transmission mode which can be transported via the packet-oriented network LAN. Similarly, signaling and payload data SGN, PLD transmitted in packet-oriented mode is converted in the fourth node unit GW4 into a timeslot-oriented transmission mode of the signaling and payload data SGN, PLD which is transmitted between the fourth node unit and the second terminal device TB.

In the exemplary embodiment, a heterogeneous communication system CSY is assumed wherein the node units GW1, GW2, GW3, GW4 or communication devices (not shown) connected to the node units GW1, GW2, GW3, GW4 operate internally according to a timeslot-oriented switching principle and accordingly have a corresponding respective switching matrix. However, a parallel arrangement of packet-oriented and timeslot-oriented switching and transmission modes is also conceivable for many other scenarios, from which the conversion based on a switching matrix represented here is taken by way of example.

It is assumed in the following that the transmitted payload data in a time period considered here is of a non-voice type, so the participating terminal devices TA, TB are operated for example for the transmission of telecopying or modem tones and are embodied for example as a telecopier or a fax machine, as a modem or generally as a unit provided for at least occasional transmission of non-voice payload data PLD. An exemplary embodiment of the method according to the invention is described here by way of example with reference to a fax transmission.

The communication system CSY known in the current prior art shows a timeslot-oriented connection TDM which is used in the case of a transmission of non-voice payload data PLD, since, as mentioned in the introduction, more than two IP/TDM transitions for non-voice payload data lead to errors or even to a failure of a successful communication connection.

Signal tones sent by the terminal device TA lead to an optimization of the transmission parameters in the first node unit GW1 as soon as a signal tone has been reliably detected. What is meant by a conversion of transmission parameters is for example a choice of a suitable codec; for details, see below. Only after said optimization by detection of a signal tone or non-voice payload data PLD of some other type and conversion of the transmission parameters is the following second node unit GW2 along the communication connection that is to be set up able for its part to detect a signal tone and likewise to optimize the transmission parameters. Next, an optimization is performed in the third node unit GW3, followed by an optimization in the fourth node unit GW4.

This chainwise optimization obstructs the communication connection that is to be set up in a way which often leads to a failure. Jitter buffers which are required for the conversions between packet-oriented and timeslot-oriented transmission modes represent a further obstacle. Said jitter buffers cause time delays in the exchange of payload data which impede or make impossible a synchronization of the terminal devices TA, TB that is required for a non-voice data communication.

For this reason a timeslot-oriented networking TDM of selected node units GW1, GW4 in the communication system CSY is held in reserve as a transmission medium for non-voice communication connections in the prior art in addition to the packet-oriented network LAN, which provision is associated with high additional costs.

A next embodiment will be explained in more detail below with further reference to the functional units of FIG. 1.

Figure 2:
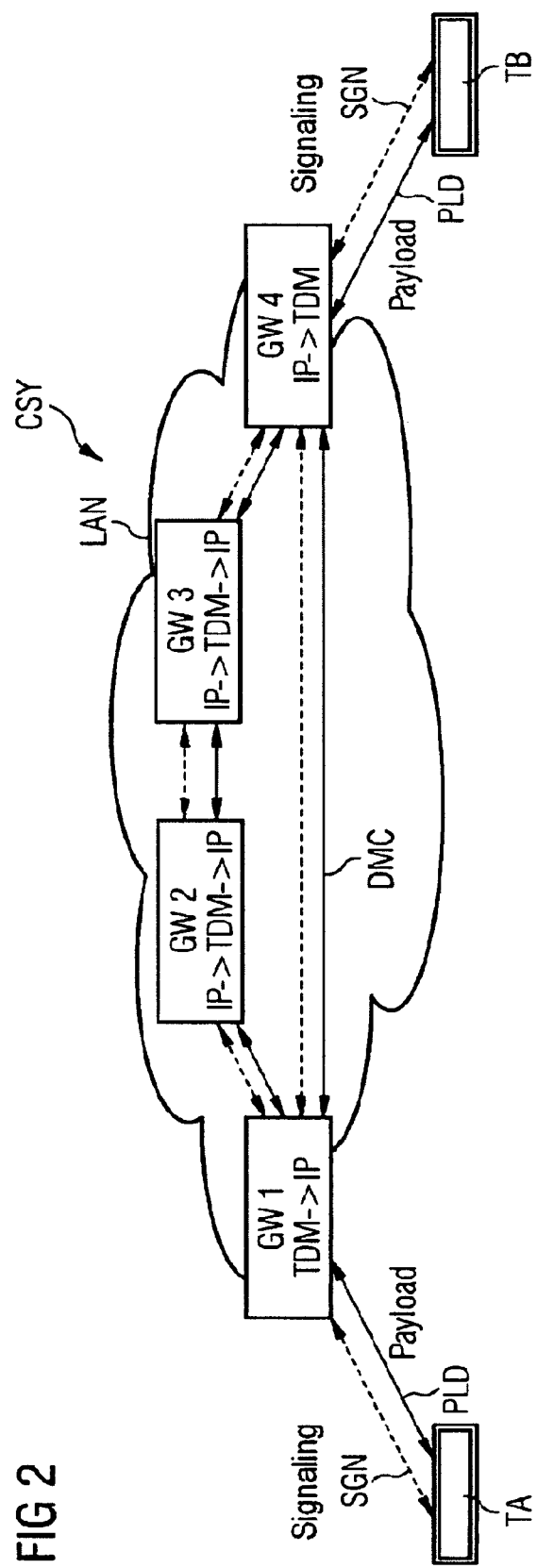
FIG. 2: shows a structural diagram schematically representing a communication session of terminal devices in a heterogeneous communication system using a direct media connection.

FIG. 2 shows a communication of terminal devices TA, TB using a direct media connection DMC.

It is first assumed that an existing communication connection is maintained on a voice basis between the terminal devices TA, TB.

It should be noted in passing that this applies to most of the terminal devices considered here. Even telecopying terminal devices and modems report the communication connection by means of signaling with a service request "voice", so initially it is not clear whether actually voice or—in our interpretation—"non-voice" information is to be exchanged. When, for example, a telecopying terminal device is used, a service request "voice" would result in a voice payload data connection not being optimal.

During the already completed setup of the communication connection a primary connection was set up starting from the calling first terminal device TA via the node units GW1, GW2, GW3, GW4 in their numeric sequence to the called second terminal device. The first node unit GW1 was registered as the entry node and the fourth node unit GW4 as the exit node with the aid of addressing data transmitted by the node units GW1, GW2, GW3, GW4 involved in the setting up of the primary connection. The direct media connection DMC or (cf. above) the secondary connection DMC was thereupon set up between the node units GW4, GW1 registered as entry and exit nodes. The communication data, in particular payload data, is thereupon transmitted via the secondary connection DMC.

For the reasons explained in the following, setting up a direct media connection DMC in the case of non-voice payload data PLD is avoided in current communication systems CSY. If a direct media connection DMC is set up, a factor not taken into account in the present prior art is whether signal tones or other non-voice payload data PLD were detected in one of the participating node units GW1, GW2, GW3, GW4. This means that a direct media connection DMC optimized for voice in terms of the transmission parameters, for example codecs, is set up initially in any case. If, during a connection setup, the called second terminal device TB operated in a telecopying mode sends a CED signaling tone ("Called Terminal Identification") in response to a CNG signaling tone or "Calling Tone" of the calling first terminal device TA, a direct media connection DMC in the process of being set up or already set up must be optimized for a telecopying mode or more generally for a non-voice payload data transmission PLD and, for example, switched over to a different codec or other transmission parameters. A "downstream" switchover of this kind results in brief interruptions in transmission, i.e. in an interruption of the payload data stream PLD. This can lead to the loss of valuable payload data which could be useful to the other node or the calling terminal device TA involved in the connection. Moreover the CNG tone is not taken into account in the optimization because it was typically detected on the primary connection. According to known fax protocols, however, the CNG signal of the calling terminal device TA is not repeated after the CED signal, i.e. this information has got lost in the course of the establishment of the direct media connection DMC. In the worst case the communication connection set up between the terminal devices TA, TB is not completed, but at the least is not optimally set for the telecopying transmission.

If a direct media connection DMC was successfully set up, its transmission parameters are thus set for voice payload data PLD. If, in this situation, the called terminal device TB now sends no further signal tones serving for an agreement on the communication connection, but already commences with the actual transmission of the telecopying data, a successful transmission of the telecopying data is extremely improbable, since said telecopying data often cannot be transmitted by way of compression codecs or by means of other transmission parameters optimized for a voice connection.

The inventive means now provide that the type of accumulated payload data PLD is stored in the node units GW1, GW2, GW3, GW4. The information held concerning the type of payload data PLD is then evaluated and taken into account during the setting up of the direct media connection DMC. Typically, with non-voice payload data PLD, said information is signal tones which the terminal devices exchange between each other in order to determine or, as the case may be, negotiate the transmission mode and the other's capabilities. What is achieved by taking into account the information held for the setting up of the direct media connection DMC is that the same information concerning the type of payload data is available to the direct media connection DMC as to the primary connection. This is of importance above all because payload data PLD is exchanged during an initialization phase and the corresponding protocols for agreeing the communication connection setup make no provision for the repetition of said payload data PLD by the calling or called terminal device TA, TB.

When the inventive means are applied, the communication setup by means of a direct media connection DMC is accomplished in the manner described below. During the connection setup, the calling terminal device TA sends a CNG signal tone via the four node units GW1, GW2, GW3, GW4 involved in the connection. The first node unit detects this signal tone and switches the coding method for the communication leg running via the packet-oriented network LAN to the next second gateway GW2 from a, for example, previously set codec G.729 to a low-compression codec G.711. The type of payload data connection PLD, in this case, therefore, a non-voice payload data connection PLD, and the completed switchover of the codec are signaled to the second node unit GW2.

If the called second terminal device TB now already accepts the connection, the connection setup signaling is not subject to the tone detection delays and therefore reaches the terminal device quickly, and the direct media connection DMC is set up by the fourth node unit GW4 nearest to the called terminal device TB. Said fourth node unit GW4 has at this time still not received any CNG tone from the calling terminal device TA. The first node unit GW1 nearest to the calling terminal device TA now applies a transmission parameter optimization obtained from the detected CNG tone to the direct media connection DMC and signals said optimization to the end point of the direct media connection DMC, hence to the fourth node unit GW4. A signaling of this kind is effected, for example, by way of an H.323 message. The fourth node unit GW4 likewise optimizes its setting of the transmission parameters, i.e. takes over, for example, the transmission parameters of the first node unit GW1 that were received by H.323 message. In this way an interruption to the payload data stream typically associated with a change of codec is avoided, since through the use of the inventive means a change of codec already takes place during the setting up of the direct media connection DMC or immediately thereafter, and moreover usually before further succeeding signal tones are sent by the terminal devices TA, TB. The payload data PLD of the terminal devices TA, TB provided for the exchange of telecopying data can now be exchanged free of obstructions via the direct media connection DMC.

If payload data information should arrive in the fourth node unit GW4 via the node units GW1, GW2, GW3, GW4 or else in the reverse direction in the first node unit GW1 while the direct media connection DMC is being set up or after it has already been set up, said payload data information can be sent subsequently using the inventive means over the direct media connection DMC, if this is necessary on account of gaps that have occurred. In addition, time intervals are registered by means of timing elements which monitor the time intervals between different signal tones and said time intervals are transmitted together with the signal tones on the direct media connection section DMC. An error situation can thus be detected on the basis of a lost or undetected succeeding signal tone. Furthermore provision is also made for a transfer of the accumulated payload data PLD from one of the node units GW1, GW2, GW3, GW4 onto the original primary connection even in the event of a failure of the direct media connection DMC. This can be useful in cases in which the primary connection runs via only a few node units, in particular fewer than the number of node units GW1, GW2, GW3, GW4 described here.

Technical embodiments of an inclusion of the held information for the purpose of setting up the direct media connection DMC in a respective node unit GW1, GW2, GW3, GW4 involved in the direct media connection DMC are explained by way of example below:

the payload data transmission settings for the direct media connection are optimized accordingly in a node unit GW1, GW2, GW3, GW4 involved in the connection, e.g. the settings for codecs, jitter buffers, echo suppression or echo compensation etc.

a node unit GW1, GW2, GW3, GW4 involved in the connection transmits information concerning the type of payload data PLD to be exchanged and associated settings to the following node unit GW1, GW2, GW3, GW4 in the communication connection setup chain. The communication protocol H.323, for example, and the method according to RFC 2833 (Request for Comment) are used for this purpose in compliance with the standard.

As a result of transferring the accumulated payload data onto the direct media connection DMC the connection can be optimized at an early stage without obstructing the further tone transmission. The gateways involved in the direct media connection DMC are synchronous early on in terms of the payload data settings. Non-voice connections via the direct media connection DMC have the typical advantages of the better transmission quality of a direct media connection, which is very important particularly for typically low-tolerance non-voice terminal devices TA, TB that were designed for circuit switching.

The invention claimed is:

1. A method for transmitting communication data comprising:
a first terminal device sending a call signaling tone to a second terminal device via a plurality of node units during a connection setup of a primary connection between the first terminal device and the second terminal device, the plurality of node units comprising a first end node unit, a second end node unit, and at least one further node unit positioned between the first end node unit and the second end node unit in the primary connection;
the first end node unit detecting the call signaling tone and switching to a coding method specified in the call signaling tone for a communication leg to the at least one further node unit of the plurality of node units in the primary connection;
the second end node unit setting up a direct media connection to the first end node unit;
the first end node unit optimizing the direct media connection at the first end node unit using at least one transmission parameter obtained from the call signaling tone;
the first end node unit sending an optimization message to the second end node unit;
the second end node unit optimizing the direct media connection using the at least one transmission parameter obtained from signaling used to form the primary connection in response to the optimization message sent by the first end node unit, the primary connection being a different connection from the direct media connection.

2. The method of claim 1, wherein the at least one transmission parameter obtained from the call signaling tone is configuration data for a codec, a jitter buffer, an echo suppression unit, or an echo compensation unit.

3. The method of claim 1 wherein the call signaling tone comprises information regarding a type of non-voice payload data.

4. The method of claim 1 wherein the first terminal device is a telecopier or a fax machine and the second terminal device is a telecopier or a fax machine.

5. The method of claim 1 further comprising storing the call signaling tone in the plurality of node units.

6. The method of claim 1, further comprising sending payload data via the direct media connection.

7. The method of claim 1 further comprising transferring payload data from at least one of the plurality of node units over the primary connection if the direct media connection fails.

8. The method of claim 1 wherein each of the node units is a gateway.

9. The method of claim 1 further comprising registering time intervals between different call signaling tones and transmitting the registered time intervals with the different call signaling tones via the direct media connection.

10. The method of claim 9 further comprising detecting an error situation based on the registered time intervals.

11. A system for transmitting communication data comprising:
a first terminal;
a second terminal;
a plurality of node units, the plurality of node units at least partially defining a primary connection between the first terminal and the second terminal in a packet oriented network, the plurality of node units comprising a first end node unit, a second end node unit, and at least one node unit between the first end node unit and the second end node unit in the primary connection;
the first terminal device sending a call signaling tone to the second terminal device via the plurality of node units during a connection setup of the primary connection;
the first end node unit of the plurality of node units connected to the first terminal device detecting the call signaling tone and switching to a coding method specified in the call signaling tone for a communication leg to the at least one other node unit connected to the first end node unit;
the second end node unit of the plurality of node units connected to the second terminal device setting up a direct media connection to the first end node unit;
the first end node unit optimizing the direct media connection at the first end node unit using at least one transmission parameter that is obtained from the detected call signaling tone;
the first end node unit sending an optimization message to the second end node unit to optimize the direct media connection;
the second end node unit optimizing the direct media connection at the second end node unit using the at least one transmission parameter obtained from signaling used to form the primary connection in response to the optimization message, the primary connection being a different connection from the direct media connection.

12. The system of claim 11 wherein the at least one transmission parameter is configuration data for a codec, a jitter buffer, an echo suppression unit, or an echo compensation unit.

13. The system of claim 11 wherein the call signaling tone comprising information regarding a type of non-voice payload data.

14. The system of claim 11 wherein the first terminal device is a telecopier or a fax machine and the second terminal device is a telecopier or a fax machine.

15. The system of claim 11 wherein the plurality of node units store the call signaling tone.

16. The system of claim 11 wherein the first end node unit or the second end node unit send payload data comprising non-voice data via the direct media connection.

17. The system of claim 11 wherein the first end node unit or the second end node unit transfer payload data over the primary connection if the direct media connection fails.

18. The system of claim 11 wherein the plurality of node units are a plurality of gateways.

19. The system of claim 11 wherein the first end node unit or the second end node unit registers time intervals between different call signaling tones and transmits the registered time intervals with the different call signaling tones via the direct media connection.

20. The system of claim 19 wherein the first end node unit or the second end node detects an error situation based on the registered time intervals.

* * * * *